(12) United States Patent
Lee

(10) Patent No.: US 7,905,316 B2
(45) Date of Patent: Mar. 15, 2011

(54) CLUTCH DEVICE OF OIL PUMP IN POWER STEERING SYSTEM

(75) Inventor: Jongkil Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 75 days.

(21) Appl. No.: 12/493,924

(22) Filed: Jun. 29, 2009

(65) Prior Publication Data

US 2010/0006387 A1    Jan. 14, 2010

(30) Foreign Application Priority Data

Jul. 8, 2008    (KR) .................. 10-2008-0065811

(51) Int. Cl.
*B62D 5/06* (2006.01)
(52) U.S. Cl. ........................... 180/421; 180/417
(58) Field of Classification Search ........... 180/417–423
See application file for complete search history.

(56) References Cited

U.S. PATENT DOCUMENTS

| | | | | |
|---|---|---|---|---|
| 4,457,390 A | * | 7/1984 | Abe et al. .................. | 180/422 |
| 4,505,350 A | * | 3/1985 | Stockton .................. | 180/421 |
| 4,519,628 A | * | 5/1985 | Randle .................. | 280/124.15 |
| 4,643,269 A | * | 2/1987 | Arciero et al. .................. | 180/421 |
| 5,921,342 A | | 7/1999 | Maruyama et al. | |
| 7,487,856 B2 | * | 2/2009 | Edson et al. .................. | 180/421 |
| 2003/0127275 A1 | * | 7/2003 | Rogers et al. .................. | 180/417 |

FOREIGN PATENT DOCUMENTS

| | | |
|---|---|---|
| JP | 3-266771 A | 11/1991 |
| JP | 4-031169 A | 2/1992 |
| JP | 4-138966 A | 5/1992 |
| JP | 10-167089 A | 6/1998 |
| JP | 2001-026277 A | 1/2001 |
| JP | 2001-106109 A | 4/2001 |

* cited by examiner

*Primary Examiner* — Tony H. Winner
(74) *Attorney, Agent, or Firm* — Morgan, Lewis & Bockius LLP

(57) ABSTRACT

A clutch device of an oil pump in a power steering system includes a pulley shaft coupled with a pulley connected with a crankshaft of an engine via a belt, a body shaft coupled with a rotor rotatably installed in a pump body and provided with a vein, clutch plates provided in the pulley shaft and the body shaft, and transmitting a rotation power of the pulley shaft to the body shaft or blocking the rotation power therebetween, an elastic member provided in the body shaft, a check valve installed on a supply port connecting an airtight space, a solenoid valve installed on a return port connecting the airtight space in the pump body with an input port through which oil is supplied to the pump body, and a controller to control the operation of the solenoid valve.

10 Claims, 7 Drawing Sheets

CLUTCH DEVICE OF OIL PUMP IN POWER STEERING SYSTEM

CROSS-REFERENCE TO RELATED APPLICATIONS

The present application claims priority to Korean Patent Application Number 10-2008-0065811 filed Jul. 8, 2008, the entire contents of which application is incorporated herein for all purposes by this reference.

BACKGROUND OF THE INVENTION

1. Field of the Invention

The present invention relates to a clutch device of an oil pump in a power steering system, which is capable of improving fuel efficiency by generating an oil pressure with the power of an engine only in steering a steering wheel.

2. Description of Related Art

Generally, a steering provided in a vehicle is a mechanical part for turning a movement direction of a traveling car according to a driver's will. In particular, since the grounding resistance of a front wheel is large in a large-sized automobile or a vehicle using a low-pressure tire, a power steering is generally used for increasing the operation force of a handle and for an easy and rapid steering operation.

The power steering is divided into a hydraulic normal power steering (NPS) using oil pressure and a motor driving power steering (MDPS) using the power of a motor. Since the hydraulic normal power steering (NPS) is manufactured at low cost gives a natural feeding in steering, the hydraulic normal power steering is widely used in most vehicles except for some deluxe vehicles. In contrast, since the hydraulic normal power steering uses the power of an engine, the hydraulic normal power steering is low in fuel efficiency.

Therefore, in recent, has been actively progressed a research for improving the fuel efficiency and minimizing energy consumption at the time of using the hydraulic normal power steering.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a clutch device of an oil pump in a power steering system, which is capable of improving fuel efficiency and minimizing energy consumption generating oil pressure by consuming the power of an engine only in steering a steering wheel through structural improvement of installing the clutch device in the oil pump constituting the power steering system.

In an aspect of the present invention, a clutch device of an oil pump in a power steering system, may include a pulley shaft coupled with a pulley connected with a crankshaft of an engine via a belt, a body shaft coupled with a rotor rotatably installed in a pump body and provided with a vein, clutch plates provided in the pulley shaft and the body shaft, and/or transmitting a rotation power of the pulley shaft to the body shaft or blocking the rotation power therebetween, an elastic member provided in the body shaft and offering elastic force to the clutch plates to transmit the rotation power of the pulley shaft to the body shaft, a check valve installed on a supply port connecting an airtight space in the pump body in which the clutch plates are installed with a discharge port discharging oil pressure from the pump body, a solenoid valve installed on a return port selectively connecting the airtight space in the pump body with an input port through which oil is supplied to the pump body, and/or a controller receiving a signal from a sensor detecting a driver's steering will to control the operation of the solenoid valve.

An insertion groove may be formed at one end of the pulley shaft in a lengthwise direction thereof and a shaft protrusion inserted into the insertion groove is formed at one end of the body shaft.

The clutch plate may include a fixed plate integrally provided at the one end of the pulley shaft and having a plurality of clutch protrusions radially protruding on one surface facing the body shaft, and/or a movable plate installed to move along a lengthwise direction of the shaft protrusion while being fitted in the shaft protrusion and having a plurality of clutch grooves configured and dimensioned to be selectively inserted with the clutch protrusions, which are radially formed on one surface facing the fixed plate.

The body shaft may include at least a serration protrusion and the movable plate includes a serration hole in the center thereof to slidably receive the serration protrusion of the body shaft therein so that the moveable plate selectively moves along the serration protrusion of the body shaft.

The elastic member may include one end coupled to the body shaft and the other end coupled to the movable plate, and offering elastic force to move the movable plate to the fixed plate, wherein the elastic member is a coil spring.

The clutch protrusion may have a shape of a rod of which one end protrudes toward the center of the fixed plate and the other end protrudes toward an outer circumference surface of the fixed plate, and the clutch groove may have one end facing the center of the movable plate and the other end facing a circumference surface of the movable plate, and has a fanwise shape in which a circular arc of the other end facing the outer circumference surface of the movable plate is larger than that of the one end facing the center of the movable plate.

A bottom portion of one side surface of the clutch groove positioned in a rotation direction of the movable plate may be configured to be lower than the other side surface of the clutch groove positioned in a direction opposite to the rotation direction of the movable plate wherein the other side surface of the clutch groove has the same level as one surface of the movable plate, so that a bottom surface extending from the bottom portion of the one side surface to the other side surface is increasingly inclined, wherein one surface of the movable plate and the one side surface of the clutch groove is formed in a right angle surface.

The check valve is configured to offer the oil pressure only to the airtight space from the discharge port.

According to various aspects of the present invention, in a case when the steering wheel is not steered (in case of an idle state or a straight traveling state), the pulley shaft and the body shaft are disconnected from each other, whereby the power of the engine is unnecessarily not consumed. Accordingly, it is possible to improve the fuel efficiency and minimize the energy consumption.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
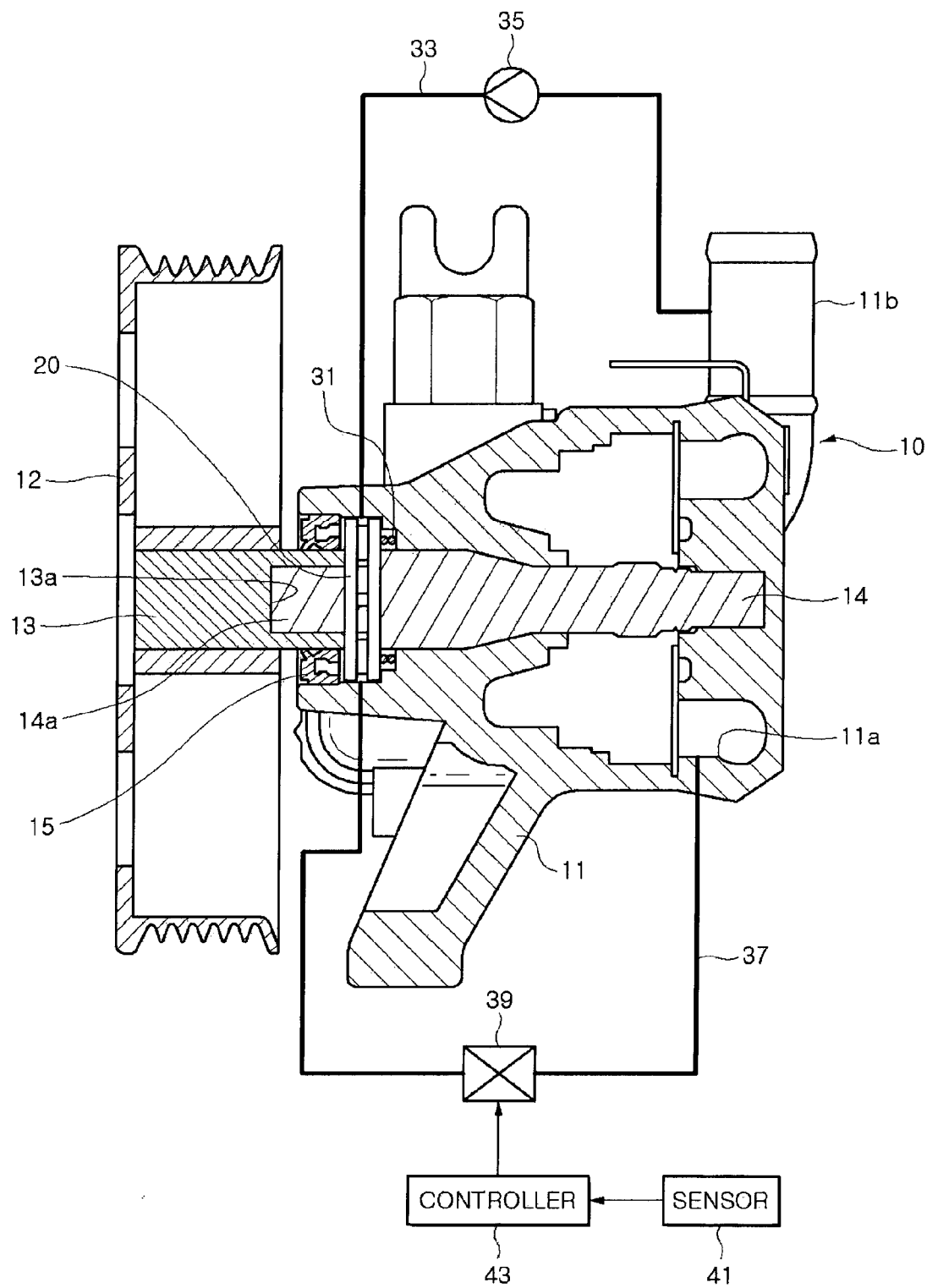
FIG. 1 is a diagram illustrating an overall structure of an exemplary gear box device of a power steering system according to the present invention.
Figure 2:
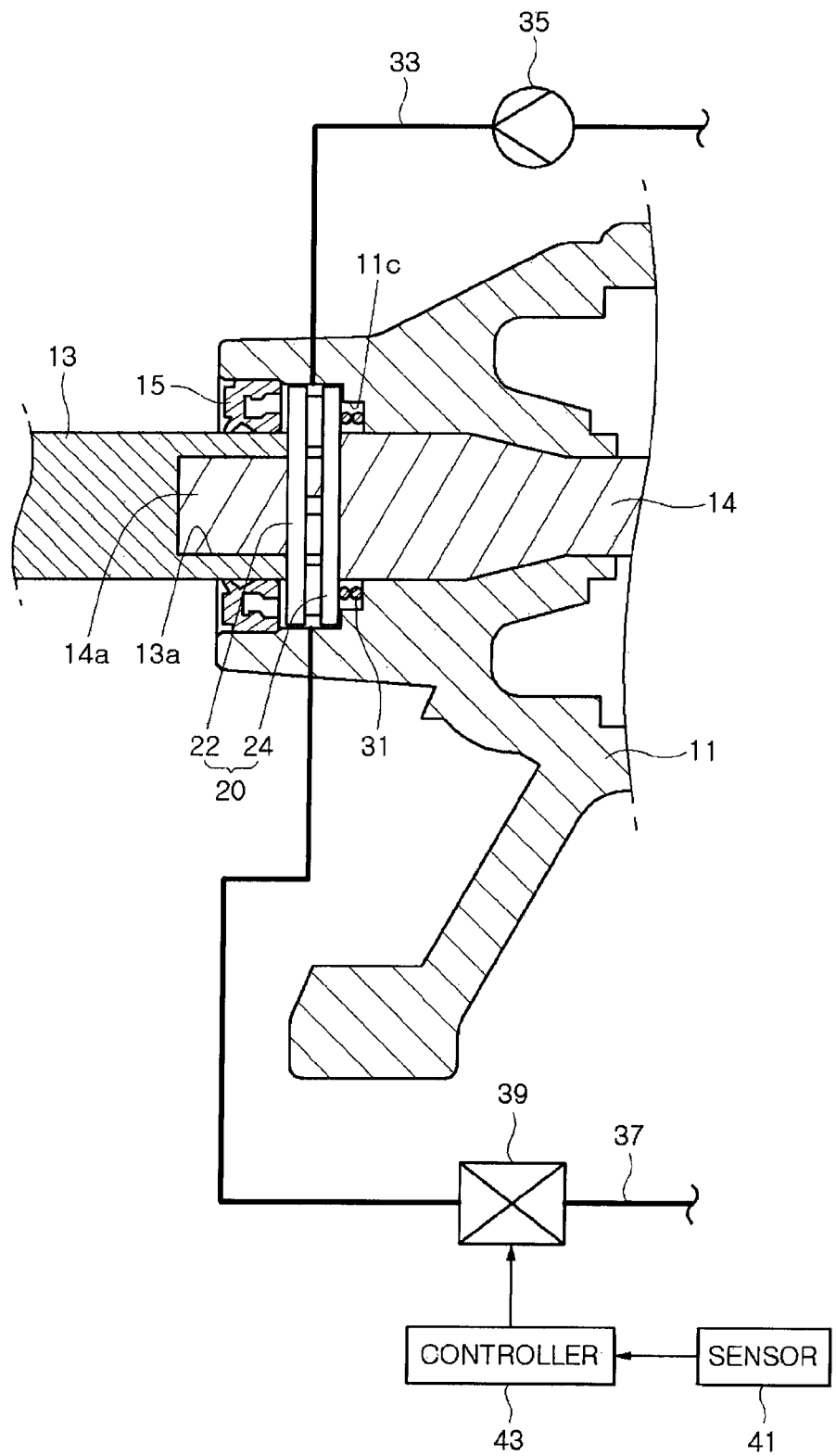
FIGS. 2 to 4 are diagrams illustrating an exemplary steering force assisting device of a power steering system according to the present invention.
Figure 3:
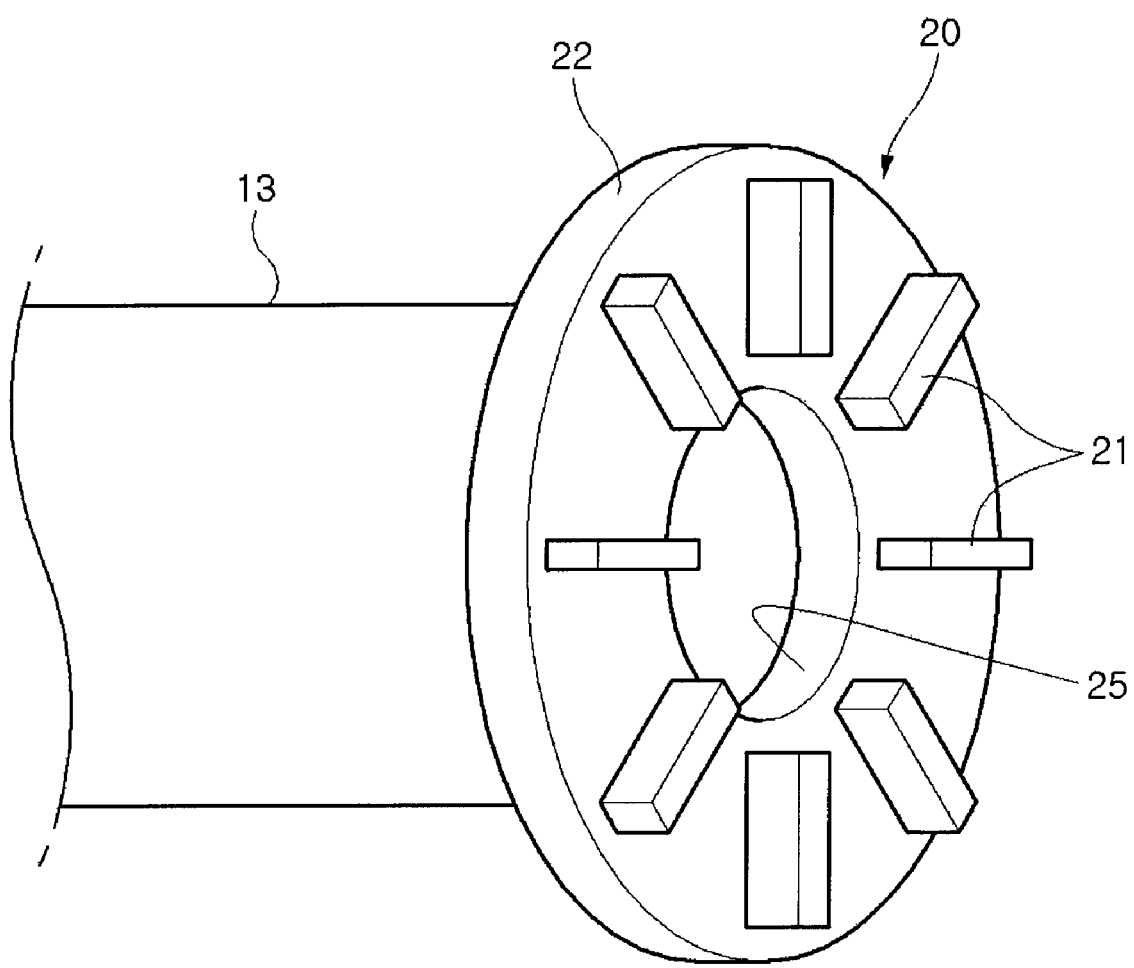
Figure 4:
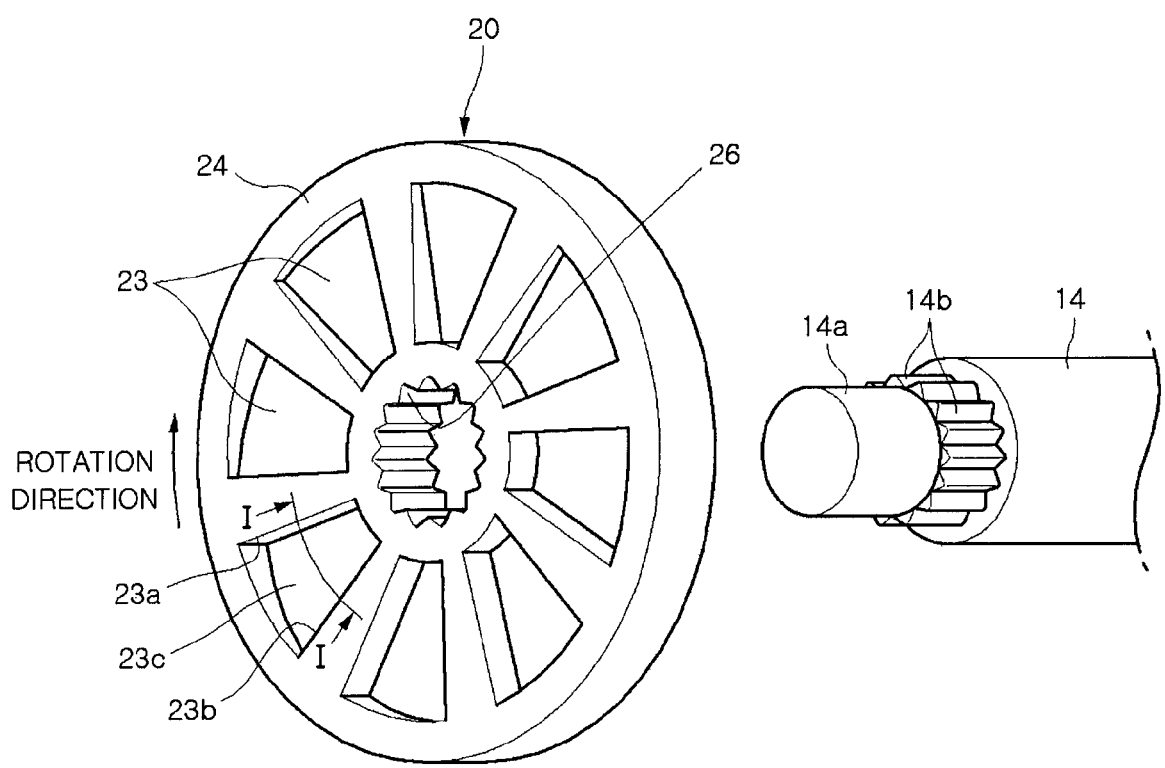

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A hydraulic normal power steering includes an oil pump. The oil pump includes a clutch device according various embodiments of the present invention.

That is, as shown in FIGS. 1 to 5, an oil pump 10 includes a pump body 11 with an input port 11a receiving oil from an oil reservoir and a discharge port 11b supplying oil pressure to an actuating device of a power steering, a pulley shaft 13 coupled to a pulley 12 connected with a crankshaft of an engine via a belt, and a body shaft 14 coupled to a rotor rotatably installed in a pump body 11 and having a vein.

A bush 15 or a bearing is coupled to pump body 11 and pulley shaft 13. An airtight space 11c is formed at the side of a bush 15 in pump body 11.

An insertion groove 13a is formed at one end of pulley shaft 13 in a lengthwise direction of a shaft and a shaft protrusion 14a inserted into insertion groove 13a is formed at one end of body shaft 14. Therefore, pulley shaft 13 is configured to be freely and axially rotatable to body shaft 14.

Freely axial rotation of pulley shaft 13 is selectively restricted by a clutch plate 20 installed in airtight space 11c.

That is, pulley shaft 13 and body shaft 14 are provided in airtight space 11c, and clutch plate 20 transmitting the rotation power of pulley shaft 13 to body shaft 14 or blocking it is installed in airtight space 11c.

Clutch plate 20 includes a fixed plate 22 integrally provided at the one end of pulley shaft 13 by welding coupling and having a plurality of clutch protrusions 21 radially protruding on one surface thereof facing body shaft 14 and a movable plate 24 installed to move in a lengthwise direction of shaft protrusion 14a while being fitted in shaft protrusion 14a of body shaft 14 by serration coupling and having a plurality of clutch grooves 23 inserted with clutch protrusions 21, which are radially formed on one surface thereof facing fixed plate 13.

A through-hole 25 is formed in the center of fixed plate 22 to allow shaft protrusion 14a of body shaft 14 to penetrate. A serration hole 26 is formed in the center of movable plate 24 to be coupled with a serration protrusion 14b formed on shaft protrusion 14a of body shaft 14.

Clutch protrusions 21 provided on fixed plate 22 have a shape of a rod of which one end protrudes toward the center of fixed plate 22 and the other end protrudes toward an outer circumference surface of fixed plate 22.

Each of clutch grooves 23 provided on movable plate 24 has one end facing the center of movable plate 24 and the other end facing a circumference surface of movable plate 24. Clutch grooves 23 have a fanwise shape in which a circular arc of the other end facing the outer circumference surface of movable plate 24 is larger than that of the one end facing the center of movable plate 24.

Figure 5:
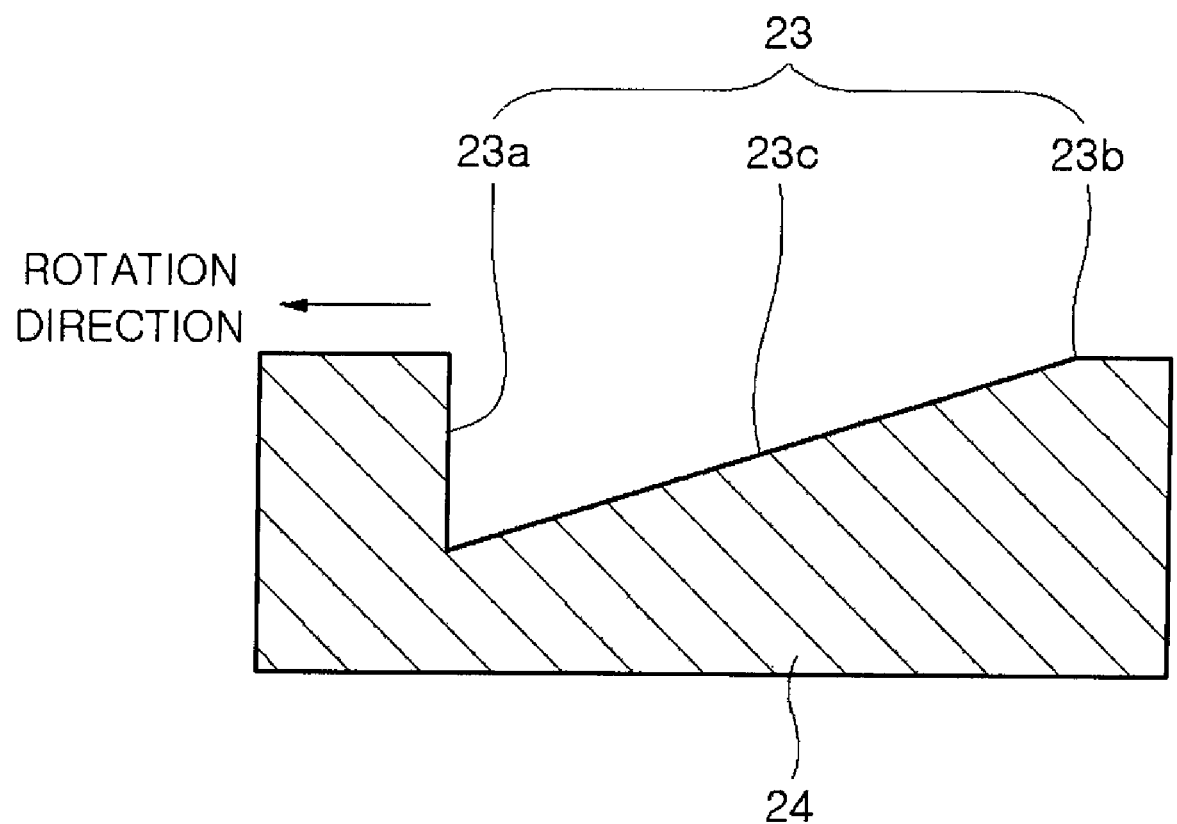
FIG. 5 is a cross sectional view of an exemplary movable plate according to the present invention.

One side surface 23a of clutch groove 23 provided on movable plate 24, which is positioned in a rotation direction of movable plate 24, forms a right angle as shown in FIG. 5. The other side surface 23b, which is positioned in a direction opposite to the rotation direction of movable plate 24, is the same as one surface of movable plate 24. A bottom surface 23c extending from the one side surface 23a to the other side surface 23b forms an inclined surface having an increasing incline.

An elastic member 31 providing elastic force to clutch plate 20 is provided in body shaft 14 so as to transmit rotation power of pulley shaft 13 to body shaft 14.

That is, elastic member 31 is a coil spring having one end coupled body shaft 14a and the other end coupled to movable plate 24, and offering elastic force so as to move movable plate 24 to fixed plate 22.

The discharge port 11b discharging the oil pressure from pump body 11 and airtight space 11c in pump body 11 in which clutch plate 20 is installed are connected to a supply port 33. A check valve 35 is installed on supply port 33.

The check valve 35 allows the oil pressure to be supplied to only airtight space 11c from discharge port 11b.

The airtight space 11c in pump body 11 and input port 11a through which oil is supplied to pump body 11 are connected to a return port 37. A solenoid valve 39 is installed on return port 37.

The operation of solenoid valve 39 is controlled by a controller 43 receiving a signal from a sensor 41 detecting a driver's steering will.

Sensor 41 detecting the driver's steering will includes a steering angle sensor or a torque sensor.

Hereinafter, the operation of various embodiments will be described.

In a case where a steering wheel is not steered by a driver (in case of an idle state or a straight traveling state) in a predetermined time after start-up of a vehicle is turned on, solenoid valve 39 is in an OFF state by the control of controller 43. Therefore, return port 37 is blocked from solenoid valve 39.

Accordingly, a fluid supplied to an input port 11a of a pump body 11 through an oil reservoir is accumulated in an airtight space 11c of pump body 11 in a supply port 33, thereby generating oil pressure.

Figure 6:
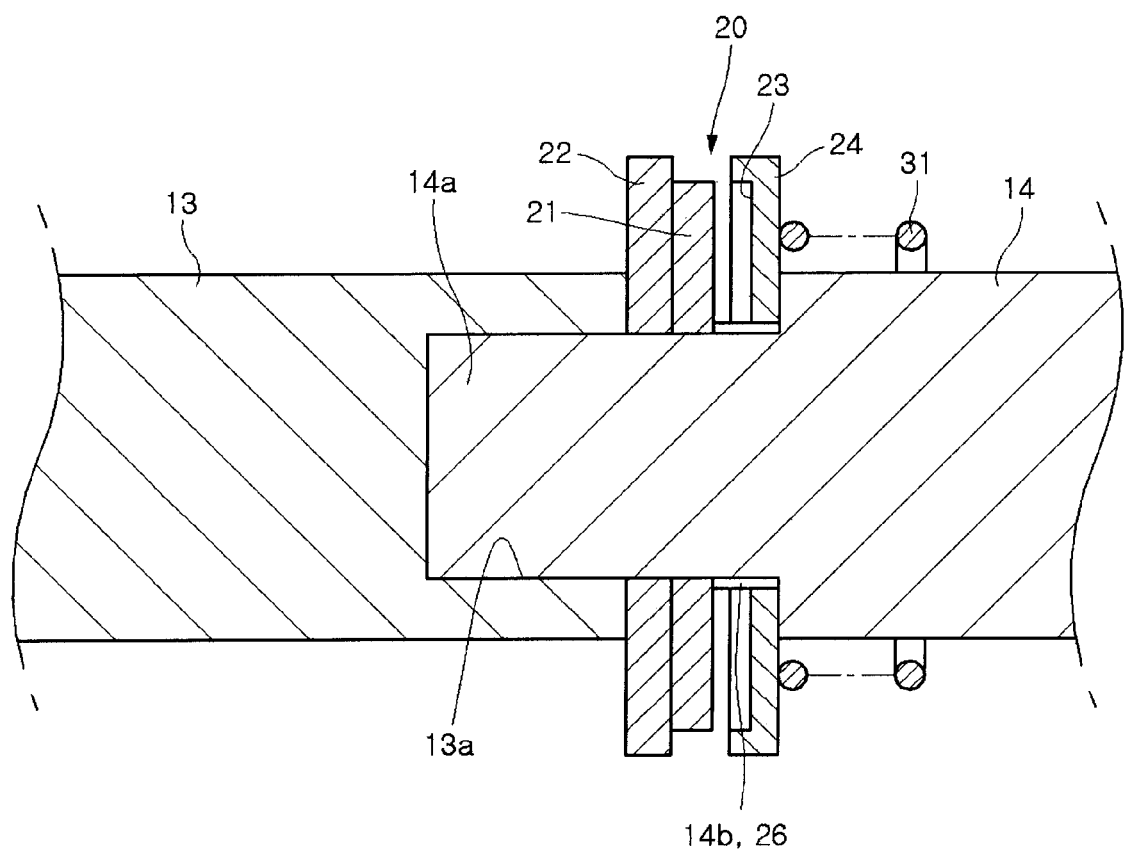
FIGS. 6 and 7 are diagrams illustrating operating conditions of an exemplary clutch device according to the present invention.

When the force of the oil pressure generated in airtight space 11c is larger than the tension of elastic member 31, movable plate 24 moves to a right side along shaft protrusion 14a from the state shown in FIG. 1. As a result, clutch protrusions 21 are removed from clutch grooves 23, whereby fixed plate 22 and movable plate 24 are in an intermittence state in which power transmission is disabled as shown in FIG. 6.

As described above, when connection between fixed plate 22 and movable plate 24 are released, pulley 12 connected to the crankshaft via the belt rotates and pulley shaft 13 rotates, but body shaft 14 does not rotate.

Accordingly, in a case when the steering wheel is not steered by the driver (in case of the idle state or the straight traveling state), the power of the engine is not consumed, thereby improving the fuel efficiency and minimizing the energy consumption.

In a case when the start-up of the vehicle is turned on and the steering wheel is steered by the driver, solenoid valve 39 is in the ON state by the control of controller 43, whereby return port 37 allows input port 11*a* and airtight space 11*c* to be connected to each other.

Accordingly, the fluid inputted into airtight space 11*c* of pump body 11 through supply port 33 is discharged to input port 11*a* of pump body 11 through return port 37, whereby the fluid is accumulated in airtight space 11*c* of pump body 11 and the oil pressure is not generated.

Figure 7:
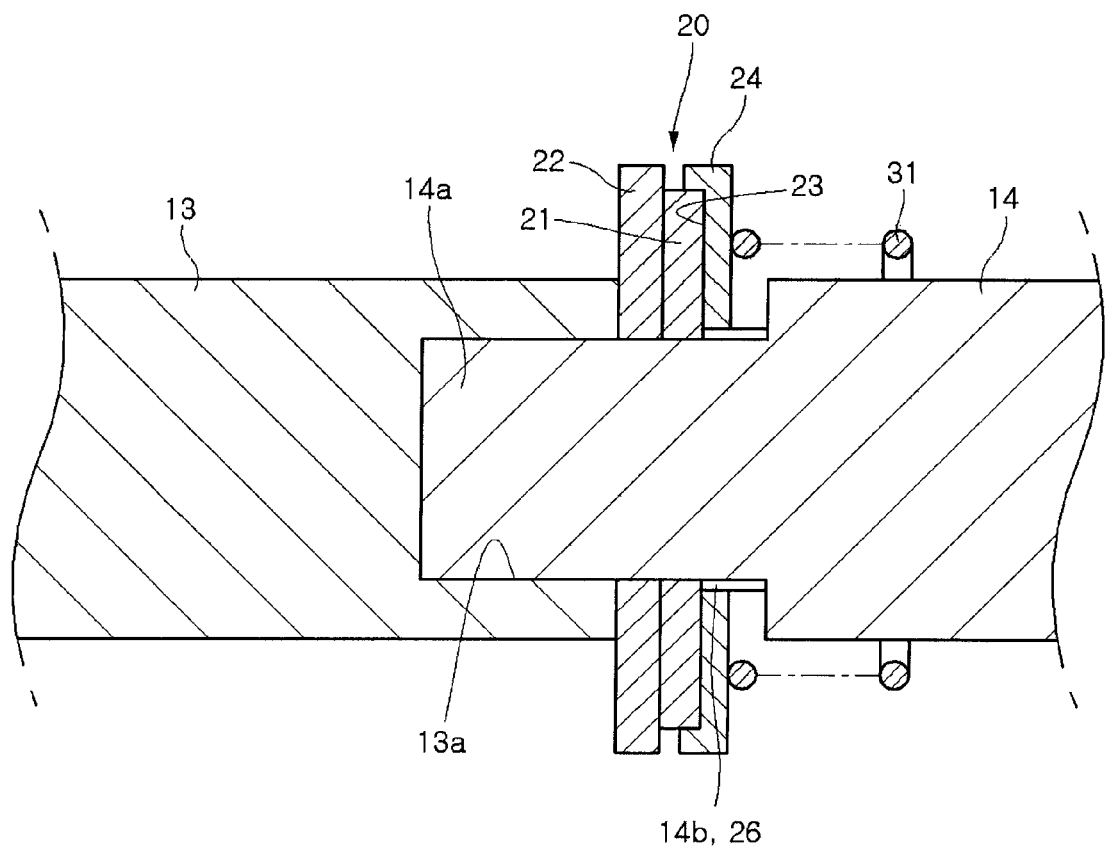

As described above, when the oil pressure is not generated in airtight space 11*c* of pump body 11, movable plate 24 moves to fixed plates 22 along shaft protrusion 14*a* by the tension of elastic member 31, whereby fixed plate 22 and movable plate 24 are connected to transmit the power through coupling of clutch protrusions 21 and clutch grooves 23 as shown in FIG. 7.

When fixed plate 22 and movable plate 24 are changed into a connection state, clutch protrusions 21 are not smoothly inserted into clutch grooves 23 due to fixed plate 22 or a loud noise is generated while clutch protrusions 21 are inserted into clutch grooves 23. However, in various embodiments, clutch grooves 23 are larger than clutch protrusions 21 and bottom surfaces 23*c* of clutch grooves 23 form the inclined surface, whereby it is possible to solve such a problem.

Accordingly, when fixed plate 22 and movable plate 24 are connected to transmit the power, the power of the engine is transmitted to pulley 12, pulley shaft 13, and body shaft 14, and the vein of the rotor generates the oil pressure by rotation of body shaft 14 to supply it to the actuating device of the power steering through discharge port 11*b*.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch device of an oil pump in a power steering system, comprising:
    a pulley shaft coupled with a pulley connected with a crankshaft of an engine via a belt;
    a body shaft coupled with a rotor rotatably installed in a pump body and provided with a vein;
    clutch plates provided in the pulley shaft and the body shaft, and transmitting a rotation power of the pulley shaft to the body shaft or blocking the rotation power therebetween;
    an elastic member provided in the body shaft and offering elastic force to the clutch plates to transmit the rotation power of the pulley shaft to the body shaft;
    a check valve installed on a supply port connecting an airtight space in the pump body in which the clutch plates are installed with a discharge port discharging oil pressure from the pump body;
    a solenoid valve installed on a return port selectively connecting the airtight space in the pump body with an input port through which oil is supplied to the pump body; and
    a controller receiving a signal from a sensor detecting a driver's steering will to control the operation of the solenoid valve.

2. The clutch device as defined in claim 1, wherein an insertion groove is formed at one end of the pulley shaft in a lengthwise direction thereof and a shaft protrusion inserted into the insertion groove is formed at one end of the body shaft.

3. The clutch device as defined in claim 2, wherein the clutch plate includes:
    a fixed plate integrally provided at the one end of the pulley shaft and having a plurality of clutch protrusions radially protruding on one surface facing the body shaft; and
    a movable plate installed to move along a lengthwise direction of the shaft protrusion while being fitted in the shaft protrusion and having a plurality of clutch grooves configured and dimensioned to be selectively inserted with the clutch protrusions, which are radially formed on one surface facing the fixed plate.

4. The clutch device as defined in claim 3, wherein the body shaft includes at least a serration protrusion and the movable plate includes a serration hole in the center thereof to slidably receive the serration protrusion of the body shaft therein so that the moveable plate selectively moves along the serration protrusion of the body shaft.

5. The clutch device as defined in claim 3, wherein the elastic member includes one end coupled to the body shaft and the other end coupled to the movable plate, and offering elastic force to move the movable plate to the fixed plate.

6. The clutch device as defined in claim 5, wherein the elastic member is a coil spring.

7. The clutch device as defined in claim 3, wherein the clutch protrusion has a shape of a rod of which one end protrudes toward the center of the fixed plate and the other end protrudes toward an outer circumference surface of the fixed plate, and
    the clutch groove has one end facing the center of the movable plate and the other end facing a circumference surface of the movable plate, and has a fanwise shape in which a circular arc of the other end facing the outer circumference surface of the movable plate is larger than that of the one end facing the center of the movable plate.

8. The clutch device as defined in claim 7, wherein a bottom portion of one side surface of the clutch groove positioned in a rotation direction of the movable plate is configured to be lower than the other side surface of the clutch groove positioned in a direction opposite to the rotation direction of the movable plate wherein the other side surface of the clutch groove has the same level as one surface of the movable plate, so that a bottom surface extending from the bottom portion of the one side surface to the other side surface is increasingly inclined.

9. The clutch device as defined in claim 8, wherein one surface of the movable plate and the one side surface of the clutch groove is formed in a right angle surface.

10. The clutch device as defined in claim 1, wherein the check valve is configured to offer the oil pressure only to the airtight space from the discharge port.

* * * * *